US008843482B2

(12) United States Patent
Buriano et al.

(10) Patent No.: US 8,843,482 B2
(45) Date of Patent: Sep. 23, 2014

(54) METHOD OF PROVIDING SELECTED CONTENT ITEMS TO A USER

(75) Inventors: Luca Buriano, Turin (IT); Giuseppe Lo Bello, Turin (IT)

(73) Assignees: Telecom Italia S.p.A., Milan (IT); Pirelli & C. S.p.A., Milan (IT)

( * ) Notice: Subject to any disclaimer, the term of this patent is extended or adjusted under 35 U.S.C. 154(b) by 1304 days.

(21) Appl. No.: 12/084,241

(22) PCT Filed: Oct. 28, 2005

(86) PCT No.: PCT/EP2005/011580
§ 371 (c)(1),
(2), (4) Date: Apr. 13, 2009

(87) PCT Pub. No.: WO2007/048432
PCT Pub. Date: May 3, 2007

(65) Prior Publication Data
US 2009/0234784 A1   Sep. 17, 2009

(51) Int. Cl.
*G06F 17/30* (2006.01)
*H04L 29/08* (2006.01)

(52) U.S. Cl.
CPC .... *G06F 17/30722* (2013.01); *G06F 17/30702* (2013.01); *H04L 67/26* (2013.01); *G06F 17/30035* (2013.01); *H04L 67/02* (2013.01); *H04L 67/306* (2013.01); *H04L 67/327* (2013.01); *G06F 17/30265* (2013.01); *G06F 17/30247* (2013.01)
USPC ...................................................... 707/732

(58) Field of Classification Search
USPC ...................................................... 707/732
See application file for complete search history.

(56) References Cited

U.S. PATENT DOCUMENTS

| 5,210,868 | A | 5/1993 | Shimada et al. |
|---|---|---|---|
| 5,414,644 | A | 5/1995 | Seaman et al. |
| 7,483,871 | B2 * | 1/2009 | Herz ..................................... 1/1 |
| 2003/0115278 | A1 | 6/2003 | Goker |
| 2005/0043060 | A1 | 2/2005 | Brandenberg et al. |

FOREIGN PATENT DOCUMENTS

| WO | WO 02/07405 A2 | 1/2002 |
|---|---|---|
| WO | WO 02/41579 A1 | 5/2002 |

OTHER PUBLICATIONS

Renda et al, "A personalized collaborative Digital Library environment: a model and an application", May 2004, Information Processing and Management, pp. 5-21.*

(Continued)

*Primary Examiner* — Rehana Perveen
*Assistant Examiner* — Hung Havan
(74) *Attorney, Agent, or Firm* — Finnegan, Henderson, Farabow, Garrett & Dunner, L.L.P.

(57) ABSTRACT

A method for providing selected content items to a user. The selection of content items is based on metadata pre-assigned to content items, typically authored content metadata, and on metadata generated and associated afterwards, called derived content metadata. Additionally, the selection of content items can be based also on context metadata, particularly derived context metadata. Derived metadata are automatically generated on the basis of derivation rules corresponding to algorithms to be applied to, e.g., the content of content items, authored content metadata and context metadata. User profiles can be used for improving the selection quality. A method is also disclosed for building and maintaining user profiles based on machine learning techniques.

19 Claims, 4 Drawing Sheets

(56) References Cited

OTHER PUBLICATIONS

Savia et al., "Metadata Based Matching of Documents and User Profiles", Proc. 8th Finnish Artificial Intelligence Conference, Human and Artificial Information Processing, pp. 61-69, (1968).
"MPEG—7 Overview", International Organisation for Standardisation Organisation Internationale De Normalisation, ISO/IEC JTC1/SC29/WG11, Coding of Moving Pictures and Audio, pp. 1-84, (2004).
Fellbaum, "Computational Linguistics", WordNet: An Electronic Lexical Database, MIT Press, vol. 25, No. 2, pp. 292-296, (1998).
Bechhofer et al.. "Owl Web Ontology Language Reference", W3 Consortium, http://www.w3.org, pp. 1-57, (2004).
Wing et al., "Smart Retrieval and Sharing of Information Resources Based on Contexts of User-Information Relationships", Proceedings of the 19th International Conference on Advanced Information Networking and Applications, IEEE, pp. 529-534, (2005).
Davis et al., "From Context to Content: Leveraging Context to Infer Media Metadata", ACM Multimedia Proc. ACM Int. Conf. Multimedia, Proceedings from the 12th ACM International Conference on Multimedia, pp. 188-195, (2004).
Mitchell, "Machine Learning", Contents, Carnegie Mellon University, McGraw Hill, pp. i-viii, (1997).
Bao; "The Research of Personalized Services in the Digital Library", Abstract of Journal of Southwest China Normal University (Natural Science, vol. 28, No. 4, p. 553, (2003).
English language translation of Notification of the First Office Action issued by Patent Office of the People's Republic of China on Apr. 13, 2010 in corresponding Chinese Application No. 200580052407.8.

\* cited by examiner

METHOD OF PROVIDING SELECTED CONTENT ITEMS TO A USER

CROSS REFERENCE TO RELATED APPLICATION

This application is a national phase application based on PCT/EP2005/011580, filed Oct. 28, 2005, the content of which is incorporated herein by reference.

FIELD OF THE INVENTION

The present invention relates to a method of providing selected content items to a user. The present invention is intended to be used for advanced content-based services provided through telecommunications means such as a data network (e.g. Internet) or a telephone network (e.g. the UMTS network).

The present invention is connected to the fields of content filtering, information retrieval, personalization of services and user profiling.

The present invention is particularly useful when applied to rich multimedia content items, i.e. those comprising different media content components (text, images, audio, video, . . . ).

BACKGROUND OF THE INVENTION

Every day in the world a lot of information is published and made available to the people through different information media, e.g. press, television, the Internet. The amount of information is rapidly increasing.

Unfortunately, the vast amount of information provided by the sources of information currently available can often be overwhelming to an individual, and that individual may become incapable of, or uninterested in, sorting through the information for items that he or she finds of interest. Therefore, what is needed is a service or ability to provide a user with only that information which the user will find of interest.

It has been common for a long time to filter content items on the basis of "keywords". Keywords are provided by a user to a software application; the software application may be local to the user's computer or may be running on a remote computer connected to the user's computer through e.g. the Internet. The software application returns to the user all the available content items that are associated to the keywords specified by the user.

Keywords are a very common type of metadata. In the past, "metadata" was defined as "information about information"; as an example, the "title" and the "abstract" of an "article" is metadata as they provide information on the content of the article that is the information itself.

More sophisticated methods have been developed for the purpose of filtering content information. These methods are based on the use of metadata for indexing the various content items, particularly "authored metadata", i.e. metadata associated to a content item by the author of the content item on by another person.

Effective filtering of content items often requires knowledge about the user, e.g. user habits and/or user preferences.

An interesting overview on filtering documents through the use of metadata and user profiles can by found in the article by Erika Savia et al., "Metadata Based Matching of Documents and User Profiles", in Proc. 8th Finnish Artificial Intelligence Conference, Human and Artificial Information Processing, pages 61-69, 1998.

From international patent application WO 02/41579, it is known a method for grouping and transmitting multimedia data. Multimedia data are analysed in terms of their content, corresponding metadata are extracted by a metadata extraction module and a user profile is prepared. Prior to receiving multimedia data from a central unit, the user sets at least parts of the user data of the user profile, by means of a communication device, and/or modifies the same. Multimedia data are selected by means of the metadata and on the basis of the user profile, and content-oriented multimedia data optimised in a user-specific manner is produced from the selected multimedia data by means of a repackaging module. Said content-oriented multimedia data optimised in a user-specific manner is stored in a data base of a content module of the central unit and provided to the user.

According to this international patent application (page 8, lines 6-14), the metadata are retrieved on the basis of a content-based indexing technology such as one of those described e.g. in U.S. Pat. Nos. 5,210,868 and No. 5,414,644.

SUMMARY OF THE INVENTION

The present invention relates to a method of providing content items to a user, in particular to provide selected content items by taking into account user preferences.

The basic idea behind the present invention is to automatically generate metadata and to use these generated metadata for selecting the content items to be provided.

The Applicant has realized that manual generation of metadata, i.e. typically authored metadata, is an enormously time-consuming activity (it will be impossible to keep up with the ever increasing amount of published information), is error prone and it is generally not service oriented. Therefore, it is practically very difficult to reach a level of accuracy adapted to filter enormous amounts of published information.

Applicant has realized that it is important to have accurate user profiles and to be able to build them and to keep them updated automatically.

Additionally, Applicant has noticed that the interaction context when providing content can be advantageously used for building or updating user profiles.

The method according to the invention can be provided by a service provider that offers a service of delivering personalized content to users. The above considerations apply when the content items are provided both in PULL mode and in PUSH mode.

According to the present invention, content and preferably also context metadata are generated automatically. Derived metadata are automatically generated on the basis of derivation rules corresponding to algorithms to be applied to e.g. the content of content items, authored content metadata and raw context metadata.

The above features provide flexibility and power to the selection method according to the present invention.

The derived metadata, in addition to explicit and/or implicit user feedback, can advantageously be used also to build and maintain user profiles. In this way, the user profile is accurately built and can be accurately maintained over time. Preferably, building and maintaining (i.e., updating) user profiles is carried out through the use of machine learning techniques.

The present invention comprises a first aspect related to processing of content items. Content processing basically corresponds to appropriate selections of content items. In the preferred embodiments, the present invention relates also to a second aspect related to user profiles processing, which basically corresponds to appropriately building and maintaining user profiles.

These two aspects are linked one another as an accurate content selection can be carried out on the basis of a user profile matching, i.e., content items are matched against a user profile. In order to build and maintain a user profile user's feedback (explicit and/or implicit) on the selected content is advantageously used.

According to a first aspect of the present invention, when a request of content from a user is received, the following steps are performed:
- a query is generated starting from the above request;
- based on this query a first set of content items are identified;
- pre-assigned content metadata (typically authored) that can be associated to each content item of this first set are identified;
- preferably, raw context metadata that represent the context information associated to the above request are identified, and
- derived metadata are generated automatically for each content item on the basis of derivation rules corresponding to algorithms to be applied to the content items and preferably also to the pre-assigned content metadata (if any) associated to said content items. More preferably, algorithms are applied also to raw context metadata.

Preferably, after generation of the derived metadata, the first set of content items is stored in a content item repository. More preferably, also the derived metadata generated following a request of a user and associated to the content items are also stored in the content item repository for future use so as to avoid repeating the process of metadata derivation.

When derived metadata associated to each content item of said first set have been generated, a second set of selected content items is provided to the user, said second set being contained within the first set of content items. According to a preferred embodiment of the present invention, the second set of content items is provided by performing the following steps:
- (derived and pre-assigned) content metadata are identified for each content item;
- preferably, context (derived and raw) metadata are identified for each content item;
- a user profile of the user that generated the request is identified,
- the content items of said first set is matched against the user profile based on at least some of the derived metadata and a ranking is produced for the content items of this set;
- based on said ranking, the second set of content items is provided to the user, said second set corresponding to the first set ordered on the basis of said ranking or (preferably) corresponding to a sub-set of content items containing the best ranked content items, and
- preferably, the user feedback (explicit and/or implicit) on the provided content items is collected.

Each content item belonging to said second set to which a user feedback has been associated corresponds to an interaction event, which is preferably stored as a record in an interaction history repository. Thus, according to a preferred embodiment of the present invention, in order to update the profile of a user the following steps are performed:
- retrieving a plurality of interaction history records relating to the user generating the request, wherein each record includes a content item and at least a user feedback (explicit and/or implicit), generally represented by a user vote, associated to said content item. Preferably, records include also user requests, raw context metadata and content metadata, derived and pre-assigned, associated to the content items;
- selecting a machine learning algorithm for building a predictive model of this user;
- coding each record (i.e., each stored interaction event) as a feature vector, which is a formal representation adapted to be used with the selected machine learning algorithm. Said feature vector comprises a plurality of elements corresponding to the metadata, derived and (if any) pre-assigned, associated to a specific content item and comprises a user feedback. If derived metadata are not present in the record, they can be retrieved from the content item repository that stores all the content items of the first set and in general the content items selected following a query;
- applying the selected machine learning algorithm to said feature vectors, each vector corresponding to an interaction event, thus building a predictive model (user model);
- (more preferably) validating the built predictive model, and
- updating the profile of the above user by substituting the old predictive model with the new predictive model.

Therefore, according to a preferred aspect of the invention, the second set of content items is provided by applying machine learning methods to the derived metadata and preferably to the pre-assigned metadata by taking into account the user feedback in order to define a ranking within the first set of content items. More preferably, context metadata (raw and derived) are taken into account as independent features in the feature vectors to which the machine learning methods are applied. If derived context metadata are not present in a record of the interaction history repository, they can be derived from raw context metadata on-the-fly as metadata derivation of raw context metadata is generally not computationally heavy.

The present invention will become more apparent from the following description to be considered in conjunction with the annexed drawings in which:

DETAILED DESCRIPTION OF THE INVENTION

Before describing the present invention in detail, some terminology definitions and descriptions are provided in the following.

Content-Based service

In this description, a content-based service is any software application that leverages a set of existing content items to build information content that can be of a value for the subscribers of the service. The way the selected contents are aggregated and presented to the user is defined by a service application logic.

The user may interact with a content-based service through a service front-end in two modes: PULL or PUSH; a content-based service may provide one or both modes. In the PULL mode, the user initiates the interaction by directly accessing the service front-end, possibly providing specific inputs, to immediately obtain the desired content. In the PUSH mode, at the time when the user subscribes to the content-based service (and possibly in subsequent times), the user can provide inputs that can later generate a service content. Based on those inputs, when such a content is generated the user is notified to access the service front-end to obtain the content.

Content Item

Within this technical field, content items are the basic units of a user content interaction for a content-based service. The content-based service provides content items generally as a reply to a request of a service subscriber, i.e. the user. A content item is what the user perceives as a single entity delivered by the service. However, a content item may comprise one or more content components. For example, if the content item is the video of a soccer match, the item can comprise the two match halves as content components.

Examples of content items are:
a movie or TV program, from e.g. an on-demand media delivery environment;
a news article, from e.g. an online newsreader;
a single Web URL result, from e.g. a Web search engine;
a song, from e.g. a content-sharing network environment;
a picture, from e.g. an online media catalogue;
a Web page, from e.g. Internet navigation;
a product page, from e.g. an e-commerce catalogue.

In general, a content item is a structured object comprising one or more content components.

Each content component is a multimedia element and may be e.g. text, image, audio, video, three-dimension model, vector graphics, graphical layout.

Examples of text component are: the text of an online newspaper article, the text portion of a news article, the text contained in a Web page, the text description of a product in an e-commerce catalogue. Examples of image component are: the pictures and drawings contained in a Web page, the photos contained in a news page, the pictures contained in an online media catalogue. Examples of audio component are: the audio file containing a song in an on-demand media delivery environment, the audio file containing a song in a content-sharing environment, the audio track in a movie, the audio track of a news article. Examples of video component are: the file containing a movie or TV program in an on-demand media delivery environment, the file containing a video in a content-sharing environment, the video portion of a news page. An example of three-dimension model component is the 3D model representing a piece of furniture on an online e-commerce catalogue. Example of Vector graphics component are: a Flash animation in a Web page, an SVG [Scalable Vector Graphics] document. An example of graphical layout is the graphical layout of a Web page.

An example of a multi-component content item is e.g. a news item relating to a piece of news and consisting of a text component (i.e. a brief text describing the piece of news), an audio-video component (i.e. an audio-video sequence describing and showing the piece of news), and an audio component (i.e. an audio sequence describing the piece of news).

Content Metadata

In the past, "metadata" was defined simply as "information about information".

More specifically (and according to the W3 ["www"] Consortium), a content metadata consists in general of data structures that describe a given content item and can be processed automatically by a machine, e.g. a computer.

Content metadata can describe each content component belonging to a content item or the content item as a whole.

Content items that are made available by content providers are often provided with metadata, such as an identification indexing (e.g., subject, field,...). Metadata which are associated to the content items when the items are available to the content-based service are referred to as pre-assigned metadata. Pre-assigned metadata are typically "authored metadata", which is a type of content metadata associated to a content item by the author of the content item on by another person, typically within a content provider organization. Authored metadata is generally manually assigned to each content item by means of an annotation process.

There are different kinds of metadata, such as: textual metadata, keyword metadata, categorical metadata (category labels having a value within a limited set of values), numerical metadata. Metadata can have a more complex structure derived from the composition of e.g. the previous kinds (structured metadata) or corresponding to a semantic network (semantic network metadata) according e.g. to RDF [Resource Description Framework].

Examples of textual metadata are: the text description associated to a picture in a Web page (multiple authored metadata may be provided relating to the content of each picture of the page), the text summary of the content of a Web page (authored metadata relate to the Web page as a whole), the song's lyrics associated to a song item. Examples of keyword metadata are: a list of keywords describing the topics covered by a news item, a list of keywords associated to the features of a movie item (as in the IMDB [Internet Movie Data Base]), a list of keywords describing the main features of the scene and the subjects depicted in a picture item. Examples of categorical metadata are: a "category" label stating the news category (within a predefined set of news categories) of a news item, a "genre" label stating the song musical genre (within a predefined set of musical genres) of a song item, a "color" label stating if a movie item is "black and white" or "colour". Examples of numerical metadata are: the integer number corresponding to the production year of a movie item, the integer number corresponding to the duration (e.g. in minutes) of a movie item, the currency number corresponding to the purchasing price of product item in an e-commerce catalogue.

Structured metadata may apply e.g. to a movie item; in fact, a movie have a cast that can be represented as a list of actor names along with their age, their role in the movie, their gender etc. A typical example of structured metadata representation is provided by the MPEG-7 description standard.

Context Metadata

The interaction context (for short simply "context") is an important element of a user content interaction for a content-based service. In fact, every user content interaction takes place within a context and the context often influences the preferences of the user making items interesting within a given context and not interesting in another context.

Interaction context information can also be associated to one or more metadata, called context metadata.

The interaction context is formed by different aspects. Typically, the most important aspects are: "date and time" (when the interaction takes place), "user location" (where the interaction takes place), "interaction device" (used by the user for the interaction), "content channel" (through which the interaction takes place), "environment state" (during the interaction), "physical world state" (during the interaction), "user state" (during the interaction).

The "user location" can be provided in several ways and in several forms, for example: spatial coordinates obtained from a GPS system or a cellular network, logical coordinates provided e.g. by a short-range wireless beacon system, transmitting a metadata description of the place where the user is located.

The features of the "interaction device" may be, for example: its mobility (i.e. mobile or fixed device), its graphic capabilities (e.g. size, resolution, number of colours of the display), its sound capabilities (e.g. number of audio channels), its brand and model.

In some environments, like an on-demand media delivery environment, each interaction involves the choice of a "content channel", like a TV channel or a movie provider.

The "environment state" may derive e.g. from the setting of environment's options in the interaction device. For example, a mobile phone device can be set into "Meeting", "Work" or "Home" mode, or its behaviour can be set into "Ringing" or "Silent" mode.

Information relating to the "physical world state" may be provided by e.g. sensors detecting temperature, lighting condition, humidity, pressure, wind speed.

Information relating to the "user state" can be provided e.g. by sensors detecting acceleration of the user's body (in order to determine if the user is standing still, walking, running, moving his hands) or some of his physiological parameters such as heart rate, blood pressure, skin electrical conductivity (in order to determine his stress/relax condition).

Context metadata derived directly from one or more physical devices are referred hereafter to as "raw context metadata". Physical devices can be for example a timer, a sensor, a switch (hardware or software). Often these devices are integrated within the terminal device (e.g. a mobile phone, a personal computer, etc.) including the user interface.

Metadata Representation

In order to simplify the access and handling of all kinds of metadata, a uniform and easily extensible format is advantageously used.

Figure 4:
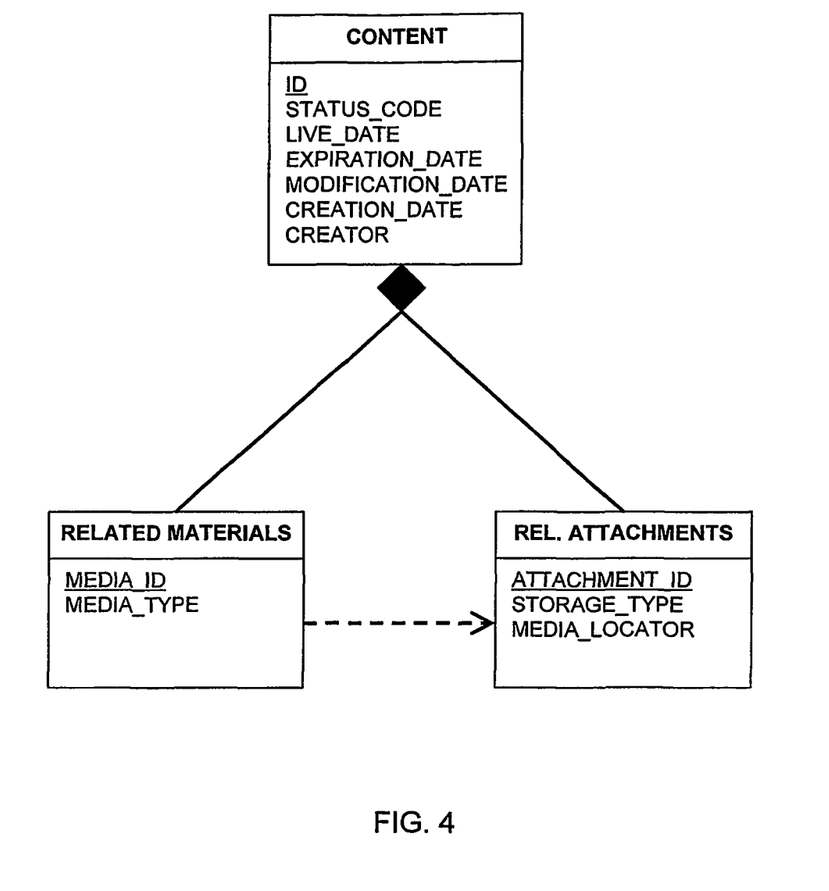
FIG. 4 shows schematically a data structure adapted for storing content items and the associated metadata and that can be used for the present invention.

The MPEG-7 description standard has been found particularly suitable for the present invention. In the embodiment that will be described later in the present description, this standard has been used as a format for all metadata, both authored and derived. In particular, a content item metadata is organized as a list of zero or more "related material" blocks (see FIG. 4), where each related material describes a homogeneous block of information that can either reference to an actual piece of content or to an XML [Extensible Markup Language] block representing the metadata. A reference always points to a related attachment block that in turn will either hold the actual content (or metadata) or provide a URL [Uniform Resource Locator] where the content (or metadata) can be found. This organization can accommodate different storage strategies while providing a centralized access point to both content components and metadata In addition to the information contained in each related material, the content metadata can also hold a group of general information that every published content should own, like the creation date, or other information that is needed by the service application logic, like a live status flag indicating if the content can be considered available or not.

The following is a "related material", encoded according to the MPEG-7 standard, reporting some common features of the component.

```
<RelatedMaterial>
    <MediaType>Image</MediaType>
    <MediaInformation>
        <MediaIdentification>
            <Identifier>image_1</Identifier>
        </MediaIdentification>
        <MediaProfile Master="true" id="image_1_profile">
            <MediaFormat>
                <FileFormat>image/pjpeg</FileFormat>
                <AspectRatio Height="322" Width="122"/>
                <FileSize>1002</FileSize>
            </MediaFormat>
            <MediaInstance>
                <Identifier>image_1</Identifier>
                <InstanceLocator>
                    <MediaURL idref="attachment_1"/>
                </InstanceLocator>
            </MediaInstance>
        </MediaProfile>
    </MediaInformation>
</RelatedMaterial>
```

The above "related material" refers to the following "related attachment", encoded according to the MPEG-7 standard, for the actual media raw data, specifically an image.

```
<RelatedAttachment id="attachment_1">
    <AttachmentData Storage="internal" Encoding="Base64Binary">
        <EncodedData>
```

Base 64 Encoding of the Image not Shown

```
        </EncodedData>
    </AttachmentData>
</RelatedAttachment>
```

The same approach can be used to introduce derived metadata; a new "related material" is added to the list and, if necessary, a reference to a new "related attachment" can accommodate a metadata XML block not fitting in this "related attachment" schema.

Although preferred, it is to be understood that the present invention is not limited to the described metadata representation.

Derived Metadata

Metadata other than pre-assigned metadata and raw context metadata are provided by the present invention and are called "derived metadata" as they derive either from content information and/or from context information (i.e., raw context metadata) within an interaction event or as a result of interaction event(s).

In particular, derived content metadata may derive directly from content items, i.e. from the content of content items, or indirectly from content items, e.g., from authored content metadata associated to content items. Derived content metadata is not directly available when a content item is published and is generated later by a software program.

Similarly, derived context metadata may derive directly from context items, i.e. from the context of an interaction event, or indirectly from context items, i.e. from raw context metadata associated to context items. Derived context metadata is not directly available when the context of an interaction event is detected and is generated later by a software program.

Derived metadata can provide more complete and usable information about the content and the context.

Derived metadata are particularly suitable for being processed automatically by a software program.

In the following, several examples of metadata derivation are mentioned.

An example of metadata derived from the content of a text item (i.e. the text itself) is the list of the words occurring in a text together with the number of occurrences of each word, called the "bag-of-words" representation of the text; such metadata gives information about the overall lexical composition of the text.

Other examples of metadata derived from the content of a text item (i.e. the text itself) comprises text metrics, i.e. numeric parameters computed on a text such as the global length of the text, the average length of sentences or paragraphs belonging to the text, the average nesting depth of the syntactical structure, the Gunning's Fog index (e.g. for an English text) and the Gulpease index (e.g. for an Italian text).

Metadata derived from the content of an image item (i.e. the image itself) includes e.g.:
  the luminance histogram, that is the distribution of the luminous intensity over the pixels of a digital image—gives information about brightness and contrast over the image;
  the colour histogram, that is the distribution of primary colour components (Red, Green, Blue) over the pixels of a digital image—gives information about the colour composition of the image;
  the spatial frequency components of an image, computed for example via the two-dimension Fourier transform—give information about the presence of patterns and textures in the image;
  geometric category metadata generated e.g. geometric hashing techniques—give information about the presence, in an image, of shapes such as lines, arcs, ellipses, polygons;
  pattern category metadata generated e.g. by pattern recognition algorithms—give information about the presence, in an image, of specific features, such as human faces, animals, plants, landscapes, buildings, flags, technical drawings, paintings, comics;
  text metadata generated e.g. by optical character recognition techniques—give information about letters, numbers and words appearing in an image.

Metadata derived from the content of a sound item (i.e. from the sound itself) includes e.g.:
  the audio frequency spectrum components, computed for example via the Fast Fourier Transform—give information about the nature and composition of the sound;
  audio waveforms—give information about the sound dynamics;
  pattern category metadata generated e.g. by pattern recognition algorithms—give information about the presence, in an audio track, of specific features, such as specific pieces of music, speech, claps, explosions;
  text metadata generated e.g. by speech recognition techniques—extract uttered words or sentences from an audio track.

Metadata can be derived from the content of a video item (i.e. from the video itself) through the use of specific analysis and algorithms.

Scene segmentation analysis techniques can give information about the time structure of a video. For example, this kind of analysis can tell that a movie is composed of a given number of scenes, a percentage of which is characterized by a strong motion behaviour and another percentage by the presence of loud music.

Moving object recognition algorithms can give information about the presence, in a video, of specific objects characterized by specific motion behaviours, such as walking people, speaking or singing people, running cars, falling objects, opening doors.

If a video is decomposed as a sequence of still images, some of the metadata extraction techniques used for still images can be also applied to a video, provided that there's a way of averaging the resulting metadata over the sequence of images.

Metadata derived from a 3D model includes e.g.:
  total area, total volume, convexity, fractal dimension;
  pattern category metadata generated e.g. by pattern recognition algorithms—give information about the presence of specific 3D shapes, such as boxes, pipes, wheels, wires, humanoid shapes, object shapes.

As already said, in general, metadata can be derived from any other metadata.

For example, starting from numerical metadata, symbolic ranges may be generated through the use of discretization techniques that are able to group numerical values; this is a way of giving a more compact and semantic representation of numerical values.

Metadata can be also derived through the use of ontologies. An ontology is the formalization of a conceptualization, using a machine-readable representation. Ontologies can be used to organize taxonomies and relationships among metadata; this allows a user preference model to be built onto higher-order semantic categories and concepts.

Information about ontologies can be found e.g. in the web site of the W3 Consortium (currently at the address "http://www.w3.org") and in the book "WordNet: An Electronic Lexical Database", edited by Christiane Fellbaum, MIT Press, May 1998.

A couple of examples are provided in the following relating to metadata derived through ontologies.

A simple ontology for time is the classification of time values in "day-time" and "night-time"; a simple ontology for date is the classification of date values in "working-day" and "weekend-day". Time value metadata and date value metadata are not meaningful in the construction of a user preference model; "day-time/night-time" and "working-day/weekend-day" metadata can be much more effective. For example, an user preference model can state that a user enjoys the interaction with content items associated to a certain category during weekend-days nights and dislikes them during working-days both during the day and during the night.

Ontologies are particularly suitable for generating categorical metadata. Let's take for example three text items A, B and C, each containing a news article. Article A talks about computer models of human lungs, and contains (among many others) the metadata words "computer" and "asthma". Article B talks about robot-assisted surgery, and contains the metadata words "software" and "surgeon". Article C talks about Internet, and contains the metadata word "website". Linking the metadata words to a lexical ontology, articles A and B could be augmented, for instance, by the abstract category "medicine", that can be added to the metadata of both articles. Analogously, the metadata of all three articles A, B and C could be augmented by the abstract categories "computer science" and "technology". Therefore, the interest of a user in these articles can be related to abstract categories rather then to the single words.

Metadata Derivation

An important aspect of the present invention is the generation (i.e., derivation) of metadata. This is achieved on the basis of derivation rules.

A derivation rule corresponds to an algorithm applied to content items and/or to context information and/or to metadata, the data on which the derivation rule is applied being generally referred to as source.

A derivation rule specifies the algorithm to be applied, by reference to the plug-in module implementing it, and the sources to be processed.

In particular, the following types of sources may be provided:
- content components;
- authored content metadata;
- raw context metadata;
- derived metadata (i.e. obtained from other derivation rules);
- extended analysis.

A derivation rule can be described for example by means of an XML [Extensible Markup Language] document that specifies the aforementioned elements (i.e. the module implementing the algorithm to be used as well as the required parameters, and the input sources to be used).

Some examples of derivation rules are given in the following.

The first set of examples is related to a news browser application. In this application, the content items are news articles. Each content item contains two content components: the title of the news article and the body, both in text form. The content of each content item is associated to the article's date, category, source and author's name as authored metadata; specifically, this metadata are comprised in the content item.

A first metadata derivation rule is defined as follows:

```
<DerivationRule ID="Body_BagOfWords">
    <Module name="BagOfWords">
        <Parameter name="language">Italian</Parameter>
    </Module>
    <Source type="ContentComponent">news.body</Source>
    <Destination type="DerivedMetadata">bodyBow</Destination>
</DerivationRule>
```

This rule prescribes to get the textual data constituting the body of the news article as input (Source) and to generate its "bag of words" representation as an output (Destination), i.e. the list of the words occurring in the body together with the number of occurrences of each word, by executing the algorithm provided by the plug-in module named "BagOfWords".

A second metadata derivation rule is defined as follows:

```
<DerivationRule ID="Body_WordOntology">
    <Module name="WordOntology">
        <Parameter name="ontology">LexicalOntology1</Parameter>
        <Parameter name="language">Italian</Parameter>
        <Parameter name="hypernyms">2</Parameter>
        <Parameter name="topsemanticlevel">true</Parameter>
        <Parameter name="minoccur">3</Parameter>
    </Module>
    <Source type="ContentComponent">news.body</Source>
    <Destination type="DerivedMetadata">bodyWordOnto</Destination>
</DerivationRule>
```

This rule prescribes to get the textual data constituting the body of the news article as input and to generate a related set of concept words as output, by executing the algorithm provided by the plug-in module named "WordOntology".

This rule executes the following steps:
- generating a "bag of words" from the source text
- matching each word from the obtained "bag of words" against "LexicalOntology1" lexical ontology. For each matching word, it extracts:
  - the hypernyms associated with the word, two levels above (hypernyms=2). A lexical ontology like LexicalOntology1 is organized as a tree. Moving from the tree's leaves towards the root, means moving from words of specific meaning towards words representing more abstract concepts. Given a word, the words located above that word in the tree are called "hypernyms" (e.g. "doctor"—"person"—"living being"; "doctor"—"professional"—"worker"). Actually there can be more than just a tree in ontology:
  - the top-level semantic categories associated with the word (topsemanticlevel="true") (e.g. the word "doctor" belongs to the top-level semantic category "Medicine").
- counting the occurrences of the extracted concepts (hypernyms and top-level semantic categories), keeping only the concepts with at least three occurrences (minoccur=3). This is done in order to limit the number of resulting concepts, keeping only the most relevant ones.

The overall result is a semantic representation of the text body of the news article, in the form of a set of concept words from the lexical ontology, each with the number of its occurrences.

The following third and fourth derivation rules are similar respectively to the above first and second derivation rules, but their source is the title of the news item instead of the body. It should be noted, however, that the metadata generated from the title will form a separate metadata set from the metadata generated from the body, as declared in the "Destination tag".

```
<DerivationRule ID="Title_BagOfWords">
    <Module name="BagOfWords">
        <Parameter name="language">Italian</Parameter>
    </Module>
    <Source type="ContentComponent">news.title</Source>
    <Destination type="DerivedMetadata">titleBow</Destination>
</DerivationRule>
<DerivationRule ID="Title_WordOntology">
    <Module name="WordOntology">
        <Parameter name="ontology">LexicalOntology1</Parameter>
        <Parameter name="language">Italian</Parameter>
        <Parameter name="hypernyms">2</Parameter>
        <Parameter name="topsemanticlevel">true</Parameter>
        <Parameter name="minoccur">3</Parameter>
    <Module>
    <Source type="ContentComponent">news.title</Source>
    <Destination
    type="DerivedMetadata">titleWordOnto</Destination>
</DerivationRule>
```

The following rule generates a numerical metadata corresponding to the news body length, expressed as the count of the words in it, by executing the algorithm provided by the plug-in module "TextMetrics".

```
<DerivationRule ID="Body_Length">
    <Module name="TextMetrics">
        <Parameter
        name="metric">textLength</Parameter>
        <Parameter name="unit">word</Parameter>
    </Module>
```

```
        <Source type="ContentComponent">news.body</Source>
        <Destination
            type="DerivedMetadata">bodyTextLength</Destination>
    </DerivationRule>
```

The following rule generates a numerical metadata corresponding to the average sentence length in the news article body.

```
<DerivationRule ID="Body_AvgSenLen">
    <Module name="TextMetrics"
        <Parameter name="metric">AvgSenLen</Parameter>
    </Module>
    <Source type="ContentComponent">news.body</Source>
    <Destination type="DerivedMetadata">avgSenLen</Destination>
</DerivationRule>
```

The following rule generates a numerical metadata expressing the estimated easiness of reading the news article body.

```
<DerivationRule ID="Body_ReadabilityIndex">
    <Module name="TextMetrics">
        <Parameter name="metric">ReadabilityIndex</Parameter>
    </Module>
    <Source type="ContentComponent">news.body</Source>
    <Destination
        type="DerivedMetadata">bodyTextLength</Destination>
</DerivationRule>
```

The following three rules generate three numerical metadata, corresponding to the number of occurrences in the news body text of dates, figures (numbers, percentages, prices) and people names.

```
<DerivationRule ID="Body_Dates">
    <Module name="TextMetrics">
        <Parameter name="metric">Dates</Parameter>
    </Module>
    <Source type="ContentComponent">news.body<Source/>
    <Destination type="DerivedMetadata">bodyDates</Destination>
</DerivationRule>
<DerivationRule ID="Body_Numbers">
    <Module name="TextMetrics">
        <Parameter name="metric">Figures</Parameter>
    </Module>
    <Source type="ContentComponent">news.body</Source>
    <Destination type="DerivedMetadata">bodyFigures</Destination>
</DerivationRule>
<DerivationRule ID="Body_PeopleNames">
    <Module name="TextMetrics">
        <Parameter name="metric">PeopleNames</Parameter>
    </Module>
    <Source type="ContentComponent">news.body</Source>
    <Destination type="DerivedMetadata">bodyPNames</Destination>
</DerivationRule>
```

The second set of examples is related to a music catalogue browser application. In this application the items are the musical pieces. Each item contains a single content component: the audio file encoding the musical piece (e.g. in mp3 format). Each item also contains the title, date, genre, performers' names and authors' names of the musical as authored metadata.

Four metadata derivation rules of the second set are defined as follows:

```
<DerivationRule ID="MusicBeatSpeed">
    <Module name="AdvancedSpectralAnalysis">
        <Parameter name="metric">BeatSpeed</Parameter>
    </Module>
    <Source type="ContentComponent">music.audiofile</Source>
    <Destination type="DerivedMetadata">BeatSpeed</Destination>
</DerivationRule>
<DerivationRule ID="MusicVocalImpact">
    <Module name="AdvancedSpectralAnalysis">
        <Parameter name="metric">VocalImpact</Parameter>
    </Module>
    <Source type="ContentComponent">music.audiofile</Source>
    <Destination type="DerivedMetadata">VocalImpact</Destination>
</DerivationRule>
<DerivationRule ID="MusicSoundBrigthness">
    <Module name="AdvancedSpectralAnalysis">
        <Parameter name="metric">SoundBrigthness</Parameter>
    </Module>
    <Source type="ContentComponent">music.audiofile</Source>
    <Destination
        type="DerivedMetadata">SoundBrigthness</Destination>
</DerivationRule>
<DerivationRule ID="MusicLoudnessDynamic">
    <Module name="AdvancedSpectralAnalysis">
        <Parameter name="metric">LoudnessDynamic</Parameter>
    </Module>
    <Source type="ContentComponent">music.audiofile</Source>
    <Destination
        type="DerivedMetadata">LoudnessDynamic</Destination>
</DerivationRule>
```

The rules above generate four numerical metadata expressing respectively the "beat speed" (i.e. a quantitative measure of the rhythmical features of the musical piece), the "vocal impact" (i.e. the weight, in the musical piece, of the human voice component with respect to the instrumental component), the "sound brightness" (i.e. a quantitative measure of the sound's brilliance) and the "loudness dynamic" (i.e. a quantitative measure of the variation over time of the sound's loudness). This can be done through spectral analysis techniques applied to the audio signal encoded in the audio file, by executing the algorithm provided by the plug-in module named "AdvancedSpectraLAnalysis".

The following rule generates a text label metadata expressing the decade of the musical piece, starting from the piece's year. This is done by a discretization technique, i.e. collapsing ranges of numerical metadata (in this case, the year) in a synthetic description (the decade), provided by the plug-in module named "NumericalDiscretizer".

```
<DerivationRule ID="MusicDecade">
    <Module name="NumericalDiscretizer">
        <Parameter name="intervals">
            -1960=old,
            1961-1970=sixties,
            1971-1980=seventies,
            1981-1990=eighties,
            1991-2000=nineties,
            2001-=recent
        </Parameter>
    <Module>
    <Source type="AuthoredMetadata">AuthMetadata.year</Source>
    <Destination type="DerivedMetadata">Decade</Destination>
</DerivationRule>
```

The following rule generates a numerical metadata expressing a rough estimate of the popularity of the music's main performer. This is obtained submitting to a web search engine, provided by the plug-in module named "SearchEngineQuery", the main performer's name, and taking the estimated number of hits (web pages containing the name) as result.

```
<DerivationRule ID="MusicPerformerPopularity">
    <Module name="SearchEngineQuery"
        <Parameter name="searchengine">yyy</Parameter>
        <Parameter name="metric">EstimatedHitsNumber</Parameter>
    </Module>
    <Source type="AuthoredMetadate">AuthMetadata.MainPerformerName</Source>
    <Destination type="DerivedMetadata">PPopularity</Destination>
</DerivationRule>
```

Derivation Rules Using Extended Analysis Sources

The extended analysis provides a special kind of source that can be leveraged by the derivation rules. This type of source specifies the application of analysis procedures over a whole subset of the items contained in a repository (even all items), in order to obtain an overall analysis of the domain's structure. Put in another way, derivation rules using extended analysis are not limited to extract metadata using only the information contained in a single item, but can generate, for each item, new metadata that takes into account the overall structure of the domain of the items themselves. The domain is the field of application of the derivation technique, i.e., the field of providing to the user personalized selected content.

The algorithms actually performing the analysis specified by extended analysis can be executed by a dedicated software module or by a general purpose metadata generator module; if a dedicated module is provided, this can be a "plug-in" module invoked by the general purpose metadata generator module when needed.

The following is a derivation rule based on extended analysis; it operates on the music catalogue application mentioned above.

```
<DerivationRule name="NearestAudioClusters">
    <Module name="NearestClusters">
        <Parameter name="numclusters">1</Parameter>
        <Parameter name="distancemetric">euclidean</Parameter>
    </Module>
    <Source type="DerivedMetadata">VocalImpact</Source>
    <Source type="DerivedMetadata">BeatSpeed</Source>
    <Source type="DerivedMetadata">SoundBrightness</Source>
    <Source type="DerivedMetadata">LoudnessDynamic</Source>
    <Source type="ExtendedAnalysis">
        <ExtendedAnalysis ID="SpectralFeatureClusterAnalysis">
            <ContentRange type="query">All</ContentRange>
            <Module name="NumericalClusterAnalysis">
                <Parameter name="method">Ward</Parameter>
                <Parameter name="maxclusters">10</Parameter>
            </Module>
            <Source type="derivedMetadata">VocalImpact</Source>
            <Source type="derivedMetadata">BeatSpeed</Source>
            <Source
            type="derivedMetadata">SoundBrightness</Source>
            <Source
            type="derivedMetadata">LoudnessDynamic</Source>
        </ExtendedAnalysis>
    </Source>
    <Destination
    type="DerivedMetadata">NearestAudioCluster</Destination>
</DerivationRule>
```

The analysis specified as an extended analysis in the above derivation rule takes as an input four derived numerical metadata obtained through the application of the derivation rules set out in the previous examples. These four numerical values describe four relevant audio features of each musical piece.

The extended analysis specifies to perform a "Cluster Analysis" over all the items (i.e. the musical pieces) contained in the content repository. Cluster analysis is a known statistical technique used to identify groups (i.e. clusters) of items characterized by similar values, given that these groups represent interesting regularities in the item's domain. In this case of a musical domain, the resulting clusters could group the musical pieces sharing a similar audio appearance, e.g. closeness to the same musical genre.

The algorithm actually executing the analysis is provided by the plug-in module named "NumericalClusterAnalysis".

In particular, the extended analysis in this example specifies the cluster analysis method to be applied (Ward's method), the range of items on which the analysis has to be applied (all the items in the repository) and the maximum number of clusters to be extracted (10 clusters).

This analysis allows the derivation rule to generate, for a given item (musical piece), a metadata indicating which cluster is closest to it. This new metadata identifies the location of the musical piece in the "musical landscape" represented by the clusters.

Machine Learning Methods

Machine learning methods allow a computer system to perform automatic (i.e., through software programs) learning from a set of factual data, belonging to a specific application field (i.e., domain). Given such a data set, machine learning methods are able to extract patterns and relationships from the data themselves.

Learned patterns and relationships are encoded by machine learning methods in a formal, quantitative model, which can take different forms depending on the machine learning technique used. Examples of model forms include logic rules, mathematical equations and mathematical graphs.

A goal of machine learning methods is that of a better understanding and quantification of patterns within data and relationships between data in order to obtain a model as a representation for the data.

Most machine learning methods use the feature vector representation. In case those methods are applied to build a predictive model of user preferences related to the provided content, each feature vector is associated to a content item comprises:
  independent features, each feature corresponding to a derived or a pre-assigned metadata associated to that content item and preferably also to a raw or derived context metadata, and
  target feature(s), represented a score provided by the user as a feedback (either explicit or implicit) related to the provided content. For example, the feedback is represented by a numerical value from 1 to 10 where a high value corresponds to a positive feedback.

Each instance of the data set is then represented as a vector of features. In case of a single target feature, the vector representing an instance is "n+1" dimensional and takes the following form:
  <feature 1, feature, 2 . . . , feature n, target feature>

The feature vector model is a formal representation of the domain data and is suitable for most machine learning methods.

An extensive discussion about machine learning methods and their applications can be found in Tom Mitchell, "Machine Learning", McGraw-Hill, 1997.

The data set (to be processed by machine learning methods in order to build the predictive models of the user profiles) preferably comprises content metadata (authored and derived) and preferably context metadata (raw and derived), as independent features. The user feedback is the target feature. The goal of the machine learning methods is to find a model (referred to as user model or predictive model) predicting user preferences, i.e. a machine learning model expressing the relationships between the metadata and the user feedback. The predictive model thus obtained can then be used for estimating the user's evaluation with respect to new content items (providing new metadata) when they become available.

An instance of data set represented by a feature vector corresponds to a single interaction event wherein a user expresses his preference with respect to one content item, and takes the following form:

<content metadata 1, . . . , content metadata m, context metadata 1, . . . , context metadata p, user vote> wherein m+p=n.

If the user expresses preferences to a plurality of content items, a plurality of feature vectors are created, which can be formally represented by a matrix (n+1)×q, where q is the number of interaction events. For instance, if the user has expressed his/her preference to 10 content items, a matrix (n+1)×10 is created. The selected machine learning algorithm is then applied to the matrix.

Several well known machine learning methods can be useful for this purpose, including decision trees, association rules, neural networks and Bayesian methods, as well as methods specifically designed for the task of building a user preference model.

An example of the use of a machine learning method in building a user profile is given in the following, with reference to the music catalogue application mentioned before.

In this simple, example the content item (a musical piece) is represented by two pieces of metadata:

MusicGenre, the musical genre (provided as authored metadata),

MusicBeatSpeed, the beats per minute of the musical piece (provided as derived metadata by the application of the "MusicBeatSpeed" derivation rule). The interaction context is represented by the following (derived) context metadata:

"Time", that can have either one of the two values "day" or "night", and which tells if the interaction of the user with the content item has happened during the day or the night (provided as derived metadata, by the application of a derivation rule based on a simple temporal ontology).

The user preference is given by the following feature:

"UserVote", which can have either one of the two values "like" or "dislike", and which tells if the user has provided a positive or a negative score to the musical piece.

Thus, with reference to the usual machine learning representation of the domain seen before, a single event of a user expressing his preference with respect to a musical piece takes the following vector form:

<MusicGenre, MusicBeatSpeed, Time, UserVote>

The following data set of user/item interactions is given by example:

| ID | Genre | MusicBeatSpeed | Time | UserVote |
|----|-------|----------------|------|----------|
| 1 | Rock | 128 | day | Like |
| 2 | Dance | 130 | day | Like |
| 3 | Dance | 125 | night | dislike |
| 4 | dance | 130 | night | dislike |
| 5 | rock | 130 | night | dislike |
| 6 | classical | 55 | day | dislike |
| 7 | classical | 60 | day | dislike |
| 8 | dance | 70 | night | Like |
| 9 | jazz | 65 | night | Like |
| 10 | classical | 75 | night | Like |
| 11 | jazz | 60 | night | Like |
| 12 | rock | 125 | day | dislike |
| 13 | dance | 135 | night | Like |

The application of a decision tree machine learning method to the above data set generates a user preference model consisting in the following rules:

IF Time="day" AND MusicBeatSpeed>=125 THEN UserVote="like"

IF Time="night" AND MusicBeatSpeed<=75 THEN UserVote="like"

It is to be noted that the above user preference rules to be used for generating predicted scores are not the derivation rules to be used for generating derived metadata.

The simple predicting model above, expressed in terms of user preference rules, tells that this specific user likes very fast music (MusicBeatSpeed>=125) during the day, while prefers more calm music (MusicBeatSpeed<=75) during the night.

It is to be noted that this model holds for the vast majority (12 out of 13) of the cases of the above data set, but not for all.

Detailed Description of an Embodiment

In the following a detailed description will be provided of an advantageous embodiment of the present invention with specific reference to the block diagram of FIG. 1 (service application); in this diagram two symbols are used: a square shape representing a software module and a cylinder shape representing a repository.

This embodiment refers to a service provider that offers a content-based service to users. This service can be either of PULL type or pf PUSH type, or both.

The content-based service provides selected content items to the users. A content item may be delivered by the service provider directly or indirectly to the user, for example by providing an address (e.g. an Internet address) where the content item is located or can be accessed. Content items are generally provided directly by content providers through a communication network, such as a packet-data network (e.g., Internet) or a mobile telephone network (e.g. UTMTS network).

The content-based service provides for building and maintaining user profiles in order to offer a better selection of content items.

The present content-based service can be divided into two activities:

processing content items, processing user profiles.

Processing Content Items

The activity of processing content items comprises:

receiving requests from a user, selecting content items on the basis of the requests of the user, preferably, formatting and presenting the selected content items to the user according to the presentation profile of the user (i.e., personalization of the presentation of content according to the service application logic), and providing the selected content items to the user.

In PULL mode, as soon as a request by a user is received, the service provider identifies a set of content items based on this request and then it carries out the above steps on this set of content items; this means that some selected content items are usually provided as replies to the user shortly after a request from the user.

In PUSH mode, the service provider receives requests from a user and store them without immediate reply and typically without immediate processing; then two possibilities exists. According to the first possibility, periodically, the service provider identifies all newly published content items and then it carries out the above steps on all newly published content items. According to the second possibility, the service provider identify one content item as soon as it is published and then it carries out the above steps on the newly published content item. In PUSH mode, the provision of content items may be carried out in two steps: at first the service provider simply notifies the user that some content items of interest to him are available and then the service provider sends (directly or indirectly) these content items as soon as the user expresses his wish to receive them; the user might also express his wish to receive only a part of these content items.

Every input by a user is received and processed by a service front end module (SFEM), e.g., a PC or mobile terminal. Requests by a user are sent to a service application logic module (SALM), which embeds the logic specific to the content-based service to be provided. Additionally, module SFEM sends to module SALM raw context metadata associated to the user requests (e.g. date and time, user location, etc.).

Figure 2:
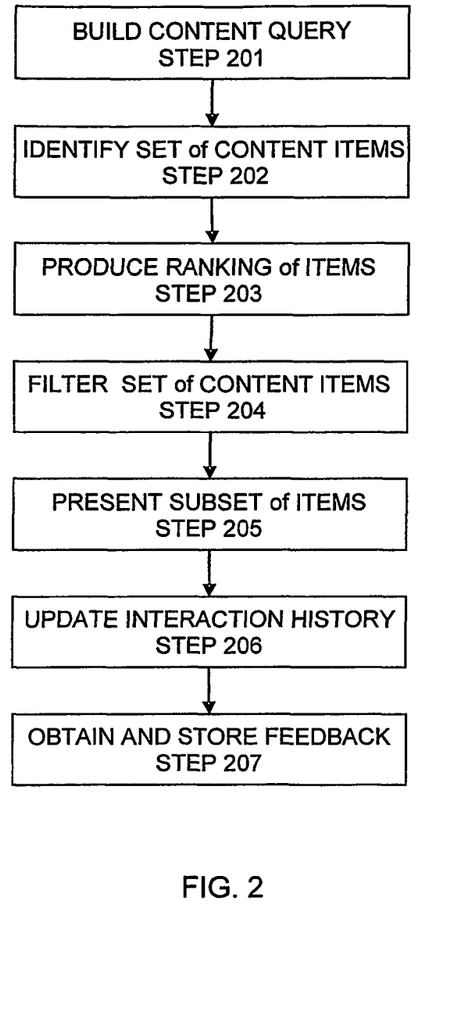
FIG. 2 shows a flow chart of the main steps in processing content items according to the present invention.

When module SALM receives a user request from module SFEM, it generates a corresponding content query (STEP 201 in FIG. 2). Based on this content query (deriving from the user request) and its service logic, module SALM identifies a first set of content items (STEP 202 in FIG. 2) in a content items repository CIR. For instance, following the content query, the service application logic identifies in repository CIR a first set of content items related to movies and TV serials.

Repository CIR stores content items as well as content metadata pre-assigned to the stored content items (typically authored metadata). As explained more in detail in the following section, repository CIR can store also the derived content metadata associated to the content items, as resulting from previous metadata generation e.g. triggered from previous content queries.

Were the user feedback to be applied to said first set of content items, usability concerns would raise as the amount of inputs that the service application can ask to the user, such as explicit preferences ("I like" or "I do not like"), is generally limited. Moreover, in many cases a precise formalization of such inputs is unfeasible.

In order to avoid poor filtering and with the final goal of retaining accurate content for the user, module SALM asks a match-maker module (MMM) to produce a ranking of the content items (STEP 203 in FIG. 2) of said first set based on a user profile. The ranking received by module SALM from module MMM can then be used by module SALM to filter out low scored content items, to choose the best scored content items and to reorder the retained content items. This can be done according to known methods.

Therefore, module SALM selects a second set of content items within the identified first set of content items by filtering the content items (STEP 204 in FIG. 2) of this first set through the help of a MMM. Module MMM is the key element of the filtering activity and is responsible for taking into account the profile of the user (or user profile), as it will be explained in the following. The second set of content items obtained by the filtering activity of the MMM is preferably a subset of the first set of content items, but it is not excluded that the second set of content items contains all content items of the first set, although ordered according to a ranking preferences so that the user can view the items according to the rank associated to them.

Module SALM aggregates, transforms and formats the content items in the subset for presenting them to the user (STEP 205 in FIG. 2); instead of presenting the selected content items, it would be possible to simply notify them to the user. Presentation and/or notification are carried out by module SFEM.

Figure 1:
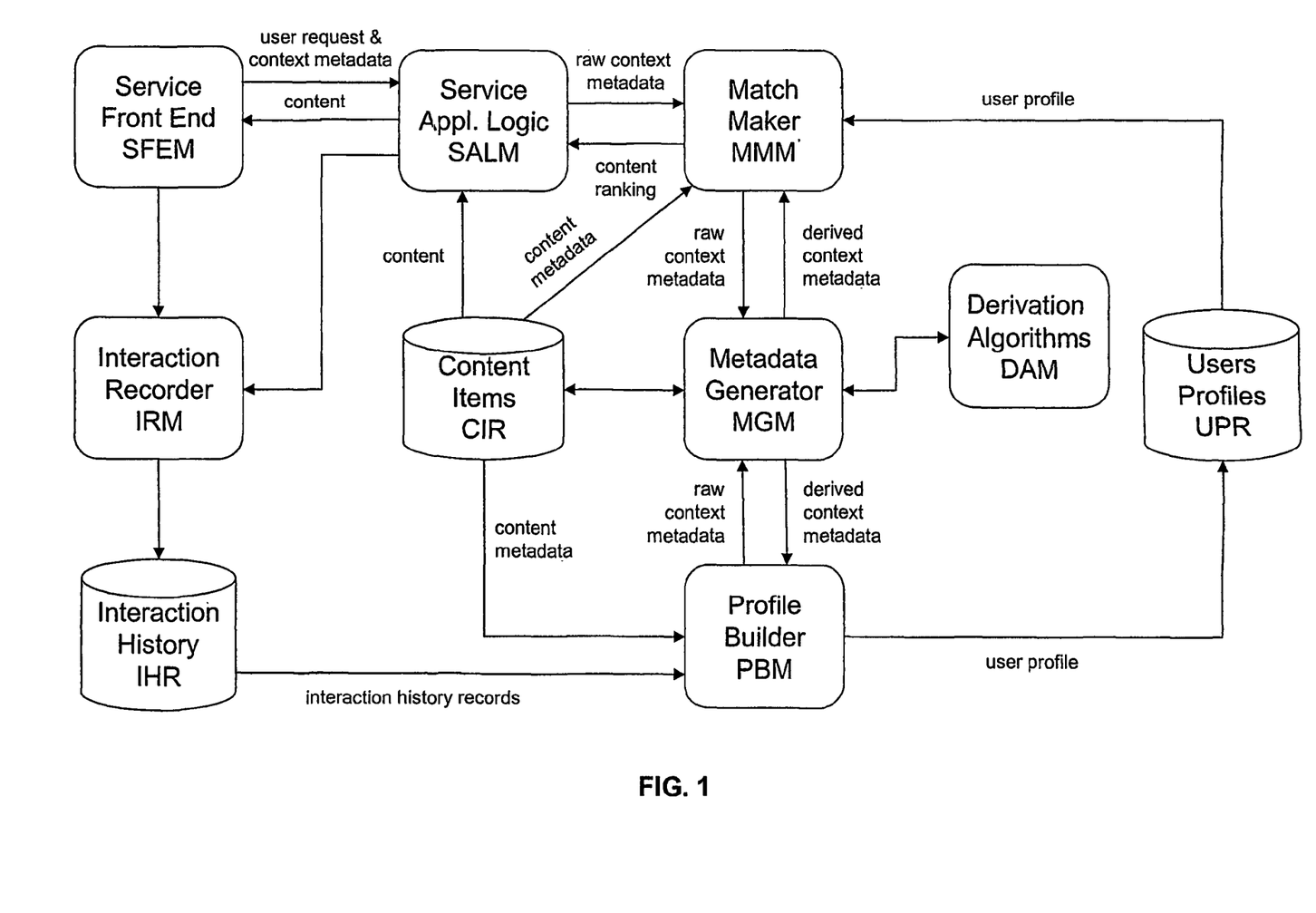
FIG. 1 shows a block diagram of a system implementing an embodiment of the method according to the present invention.

According to a preferred embodiment of the present invention, the architecture of FIG. 1 comprises:
a user profiles repository (UPR),
a metadata generator module (MGM).

Module MGM provides a set of derivation rules in order to generate derived metadata (content and/or context). Derivation rules are based on derivation algorithms. In the embodiment of FIG. 1, these algorithms are external to module MGM and are provided by a derivation algorithm module (DAM) that is realized through the "plug-in" technology; this allows to have locally as well as remotely stored algorithms that are called or invoked by module MGM.

Module MMM retrieves:
the user profile of the current user from repository UPR; and
for each content item in the said first set of content items, the content metadata, both pre-assigned (typically authored) and possibly derived (as a result of previous interaction events), associated thereto from repository CIR.

Additionally, module MMM receives context metadata associated to the current context from other modules. Specifically, raw context metadata are received from module SFEM through module SALM, and derived context metadata are received from module MGM.

Module MMM sends raw context metadata to module MGM, asking to generate derived metadata (starting from at least the raw context metadata), and receives the generated derived context metadata. In this way, at least some context metadata may be derived on the fly, i.e. during the interaction with the user.

Then, module MMM applies the user profile to the content metadata (both pre-assigned and derived) associated to each content item within the identified first set of content items and preferably to the context metadata (both raw and derived) associated to the current context. In this way, module MMM matches the first set of content items against the user profile. In the present embodiment, the user profile comprises at least a predictive model (generated preferably by machine learning methods). The predictive model is applied to each content item of said first set and generates a predicted vote for each content item. The set of predicted votes associated to the first set of content items is used by the module MMM to produce a ranking of the content items of the first set. Said ranking will be provided to module SALM, which will define a second set of content items formed by the ranked set of content items or by a sub-set of the first set of content items selected as a result of said ranking (e.g., comprising only the best ranked content items of the first set).

Preferably, the present embodiment additionally provides for:
- a user interaction recorder module IRM, and
- an interaction history repository IHR.

The interaction history may take the form of a sequence of records each of them containing several pieces of information relating to e.g. user requests (or the corresponding query), system replies, context, metadata, user feedback. Preferably, a synthetic format is used (for example links or indexes instead of physical items). Typically, each record of the interaction history correspond to a different interaction event.

Module IRM has the task to update the interaction history (STEP 206 in FIG. 2). To this regard, module IRM directly records the user requests (received from module SFEM) into repository IHR. Additionally, module SALM records, through module IRM, its replies (in terms of content items) to the user requests into repository IHR. Module SALM may also record, through module IRM, into repository IHR the predicted votes and/or all or part of the (content and/or context) metadata used for replying to the user.

Advantageously, in order to save storage space in repository IHR, only one type of metadata, namely raw context metadata, are stored into repository IHR (as, at any time, the other metadata can be retrieved from repository CIR or generated by module MGM); this can be carried out by module IRM that receives such metadata directly from module SFEM.

The service application may ask the user to provide his feedback relating to the content items provided in reply to his requests; module SALM may use module SFEM also for this purpose. A typical feedback from the user is represented by votes (that can be directly compared with predicted votes). In this case, module SALM may store, through module IRM, such explicit feedback into repository IHR. Advantageously, the service application logic is designed so as to leave to the user the freedom of providing explicit feedback or not.

Alternatively, when the service application logic does not provide for explicit feedback from the user, the user's behaviour can be monitored in order to derive implicit feedback therefrom (this can be carried out e.g. by module SFEM); for example, a vote may be associated to the time spent by a user in reading a news item provided by a news service. In this case, such implicit feedback may be recorded into repository IHR by module IRM.

The processing and recording of user's feedback (STEP 207 of FIG. 2), be it explicit and/or implicit, may be carried out after every reply or at the end of a service interaction session.

It is to be noted that, if a content item comprises a plurality of content components, feedback may relate to the content item as a whole; advantageously, feedback may relate alternatively or additionally to each component of the content item. For example, a user may express votes relating to a movie globally or express separate votes for its video component and its audio component. In this case, for example, separate votes are recorded as interaction history.

Processing User Profiles

The activity of processing user profiles consists in creating (building) and maintaining (e.g., updating) the user profiles. In the architecture of FIG. 1, user profiles are stored in repository UPR and a user profile builder module PBM is provided for carrying out the activity of processing user profiles.

This activity may be advantageously carried out "off line", for example during the night when the number of user interactions is much smaller.

According to the present embodiment, module PBM performs the following steps:
- retrieving from repository IHR an interaction history (STEP 301 in FIG. 3) of a user (either the complete interaction history or a partial interaction history corresponding to the time frame from the last user profile update to the present time). The interaction history comprises at least an event, generally a set of events. An event typically comprises a content query (corresponding to the user request), raw context metadata and the set of selected content items provided following the query and preferably the user feedback;
- selecting an appropriate machine learning algorithm (STEP 302 in FIG. 3) adapted to build a predictive model of the user preferences based on the information contained in the interaction history;
- for each interaction event, $E_i$, in the interaction history, PBM module generates a feature vector, typically a single vector, $V_i$, (STEP 303 and STEP 304 and STEP 305 in FIG. 3) of "n+1" dimensions, where n is the sum of the number of the features related to the content metadata (pre-assigned and derived) and the number of the features related to the context metadata (raw and derived);
- applying the selected machine learning algorithm to the feature vectors ($V_i, V_j, V_k \ldots$ associated to events $E_i, E_{ja}, E_k \ldots$) generated in the previous step in order to build a new predictive model to be incorporated in the user profile (step 306). Machine learning algorithms can be able to process only a single feature vector at a time, or they can manage to process a set of feature vectors at a time (as in the example set out before where the model is generated by processing thirteen vectors corresponding to thirteen interaction events);
- (preferably) validating the performance of the newly built predictive model against a predetermined acceptance criterion (typically, a "better than before" type criterion) as a condition for the user profile update (step 307). For example, a known and effective validating technique is the "ten-fold cross-validation" that is based on a ten different partitioning of the events (e.g. 90% of events for building the model and 10% of events for validating the model). Depending on the particular implementation, validation can be integrated within the machine learning methods, and
- updating the user profile by substituting the previous model with the new model in repository UPR (step 308).

Figure 3:
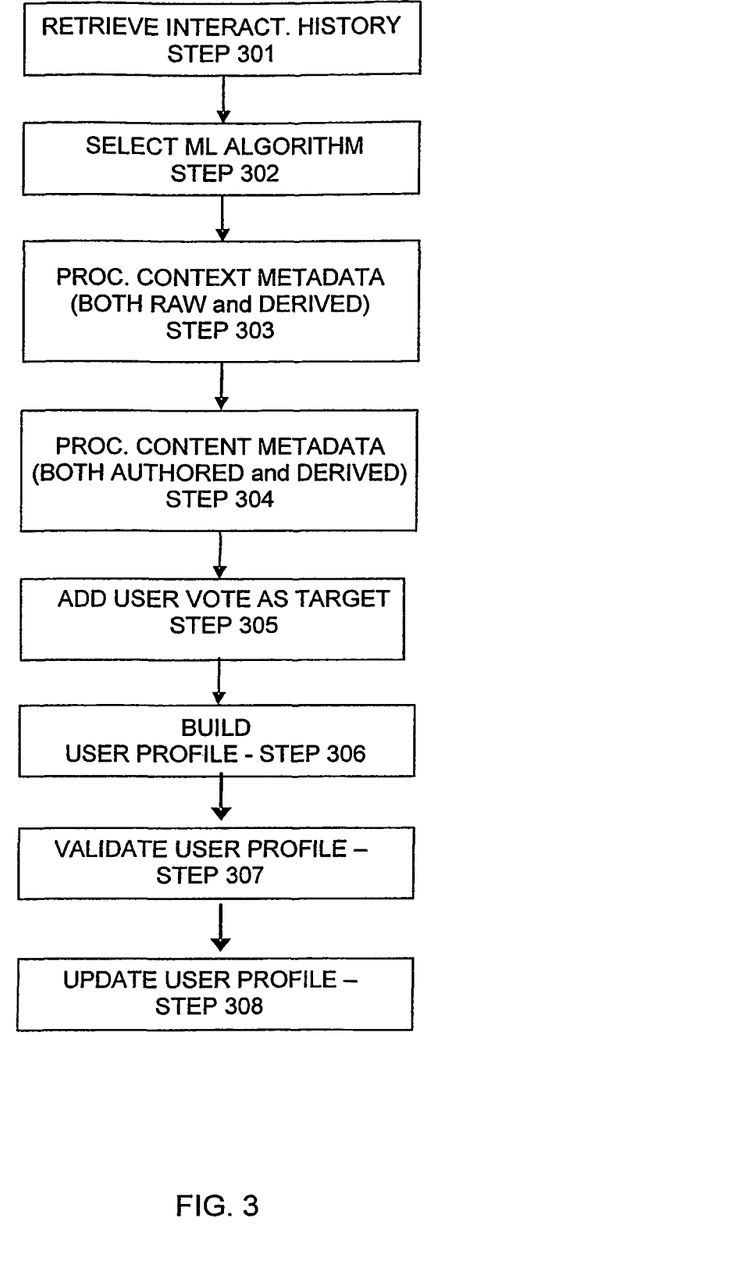
FIG. 3 shows a flow chart of the main steps in processing user profiles according to the present invention.

The generation of a feature vector, $V_i$, related to the interaction event $E_i$ may be carried out according to the following steps:
- retrieving raw content metadata;
- sending raw context metadata (recorded in the interaction history) to module MGM, asking to generate derived context metadata from the raw context metadata; coding the raw context metadata and the derived context metadata (obtained from module MGM) into a context feature vector, $V_{ix}$, of dimension p (the above two steps are indicated as a single step 303 in the flow chart of FIG. 3);
- retrieving content metadata (both authored and derived) from repository CIR;
- coding the content metadata into a content feature vector, $V_{ic}$, of dimension m, where m+p=n, (the above two steps are indicated as a single step 304 in FIG. 3);
- joining the content feature vector, $V_{ic}$, to the context feature vector, $V_{ix}$, generated in the previous steps and adding user vote as target feature, t, into a single feature vector of n+1 dimension, $V_i=<V_{ix}, V_{ic}, t>$ (STEP 305 in FIG. 3);

identifying a machine learning method algorithm, and applying said machine learning method algorithm to said feature vector, $V_i$, in order to obtain a predictive model of user preferences.

It is to be noted that the above listed steps may be used even when there is no previously existing predictive model, i.e. they may used not only for updating a user profile but also for building a new user profile. In that case, a fictious user model would be used where for instance to any content, a positive feedback is assumed.

If it is provided that the user expresses feedback on each component of a multi-component content item, module PBM should take into account such more detailed feedback.

The above description assumes that a user has only one user profile. Anyway, the present invention may be extended to the case when a user has more user profiles and can switch between them. This may be advantageous e.g. when context metadata is insufficient for an accurate description of the interaction context; for example, it is difficult for a terminal (i.e. an interaction device) to automatically determine if a user is at home or in the office (unless the user sets an environment's option in the interaction device).

The choice of the user profile can be made at the beginning of an interaction session, usually comprising a number of requests and corresponding replies with implicit or explicit feedback.

Alternatively, the choice of the user profile can be made on the fly at the very moment of the feedback action.

For example, let us assume that a user, in a movie browsing application, finds a horror movie he likes. He gives a high first vote to that item, specifying that the first vote is referred to the "Personal" profile. Since horror movies are not good for his children, he gives also a very low second vote to the same movie, this time specifying that the second vote is referred to the "Family" profile. Alternatively, the user can set one of its profiles as the current profile; votes given by the user will be referred to the profile set. When the user asks for ranking or recommendations about movies, he will need to specify the profile under which the recommendations are to be given.

In an embodiment wherein multiple user profiles are provided, the module of FIG. 1 needs to take into account of this multiplicity. Module IRM needs to record into repository IHR also information about the user profile. Module PBM needs to choose the correct user profile to be updated. Module MMM needs to select and use the correct user profile for producing ranking of content items.

The invention claimed is:

1. A method of providing selected content items to a user, comprising the steps of:
   A) identifying a first set of content items based on a request by the user, wherein first content metadata are pre-assigned to the content items of said first set;
   B) automatically generating second content metadata for the content items of said first set on a basis of at least a first derivation rule, said derivation rule corresponding to an algorithm applied to at least the content items of said first set;
   C) associating said second content metadata to the content items of said first set; and
   D) providing a second set of selected content items from said first set on a basis of said first content metadata and said second content metadata,
   wherein step D) is carried out based on a user profile of the user comprising a predictive model, and
   wherein the method further comprises building the predictive model based on a feature vector and metadata, wherein the metadata comprises textual components and numerical components, and wherein the feature vector comprises metadata including at least one textual component from at least one of the first content metadata or the second content metadata,
   wherein in step D) a ranking to each of the content items of said first set is provided on a basis of said second content metadata and of said predictive model so as to define said second set of content items based on said ranking.

2. The method according to claim 1, wherein said algorithm is to be applied also to at least some of said first content metadata.

3. The method according to claim 1, wherein step B) is carried out also on the basis of first context metadata relating to an interaction context of said selected content items in order to automatically generate second context metadata.

4. The method according to claim 1, further comprising deriving said second content metadata from an algorithm applied to a plurality of content items.

5. The method according to claim 1, wherein said ranking to each of the content items of said first set provided on the basis of said second content metadata and of said second context metadata and of said user profile, and to select said second set of content items based on said ranking.

6. The method according to claim 1, wherein said second set of content items is provided as replies to corresponding requests by said user.

7. The method according to claim 1, further comprising the step of associating a feedback from said user to at least a content item of said second set.

8. The method according to claim 7, further comprising the step of recording at least a content item of said second set and a feedback from said user related to said at least a recorded content item.

9. The method according to claim 8, comprising the step of recording at least part of said second content metadata used for selecting said at least a content item.

10. The method according to claims 8, comprising the step of recording said user request.

11. The method according to claim 8, comprising the step of building or updating the predictive model of said user based at least on said recorded content item and user feedback.

12. The method according to claims 11, comprising the step of recording at least part of said second content metadata and the step of building or updating a predicative model of said user based at least on recorded second content metadata.

13. The method according to claim 12, wherein said predictive model is built or updated through at least one machine learning algorithm applied to at least said second content metadata.

14. The method according to claim 13, wherein said machine learning algorithm is applied also to at least some context metadata.

15. The method according to claim 1, wherein the user profile comprises at least two predictive models.

16. The method according to claim 1, wherein said second set of content items is provided by a service provider.

17. The method according to claim 1, wherein said selected content items are provided through a telecommunication network.

18. A non-transitory computer readable medium encoded with a computer program product comprising software code portions, which when loaded into the memory of at least one computer and executed by the at least one computer, perform the method of claim 1.

19. A method for providing a content-based service comprising:
- collecting content requests from a user;
- identifying a first set of content items based on said content requests by the user, wherein first content metadata are pre-assigned to the content items of said first set;
- automatically generating second content metadata for the content items of said first set on a basis of at least a first derivation rule, said first derivation rule corresponding to an algorithm applied to at least the content items of said first set;
- associating said second content metadata to the content items of said first set; and
- providing a second set of selected content items from said first set on a basis of said first content metadata and said second content metadata,
- wherein providing the second set is carried out based on a user profile of the user comprising a predictive model, and
- wherein the method further comprises building the predictive model based on a feature vector and metadata, wherein the metadata comprises textual components and numerical components, and wherein the feature vector comprises metadata including at least one textual component from at least one of the first content metadata or the second content metadata,
- wherein providing the second set comprises providing a ranking to each of the content items of said first set on a basis of said second content metadata and of said predictive model so as to define said second set of content items based on said ranking.

* * * * *